United States Patent [19]

Enda

[11] Patent Number: 4,696,363
[45] Date of Patent: Sep. 29, 1987

[54] MOTORCYCLE FRAME

[75] Inventor: Ryuichi Enda, Iwata, Japan

[73] Assignee: Yamaha, Japan

[21] Appl. No.: 893,670

[22] Filed: Aug. 6, 1986

[30] Foreign Application Priority Data

Aug. 7, 1985 [JP] Japan ................................ 60-173830

[51] Int. Cl.⁴ ............................................ B62K 19/22
[52] U.S. Cl. .................................. 180/219; 280/281 R
[58] Field of Search .................... 180/219; 280/281 R, 280/284

[56] References Cited

U.S. PATENT DOCUMENTS 2,470,441 5/1949 Maier et al. .................... 280/281 R
4,561,519 12/1985 Omori ................................. 280/284

Primary Examiner—John J. Love
Assistant Examiner—Donn McGiehan
Attorney, Agent, or Firm—Ernest A. Beutler

[57] ABSTRACT

A motorcycle having an improved, lightweight, high strength frame formed from castings and stampings that are welded to each other.

6 Claims, 3 Drawing Figures

MOTORCYCLE FRAME

BACKGROUND OF THE INVENTION

This invention relates to a motorcycle frame and more particularly to an improved, lightweight frame for a wheeled vehicle such as a motorcycle.

There are a wide variety of motorcycle or motorcycle type vehicles that are designed to be ridden by a single rider and which have at least one dirigible front wheel that is supported for steering movement directly by the frame. With this type of vehicle, it is desirable to provide a very light weight for the frame because the lighter weight permits better handling, better fuel economy and improved performance. However, the frame must, in addition to carrying the engine and rider, absorb all of the suspension loads of the vehicle. Therefore, frames of the type heretofore proposed have been quite heavy.

It is, therefore, a principal object of this invention to provide an improved lightweight and simplified frame for a motorcycle type vehicle.

It is another object of this invention to provide an improved lightweight and highly strong frame.

SUMMARY OF THE INVENTION

This invention is adapted to be embodied in a frame for a motorcycle type vehicle having a head pipe that is adapted to dirigibly support at least one front wheel. A main frame member is affixed at its forward end to the head pipe and has a pair of portions that extend rearwardly from the head portion and diverge therefrom to provide a generally triangular shape. An engine supporting member is affixed to the rear end of each portion of the main frame portion. A seat carrying member is affixed to the rear end of the main frame member and extends rearwardly therefrom. The connection between the seat member and the main frame member is forwardly of the engine supporting member. A reinforcing bracket extends between the engine supporting member and the seat frame member between the ends of the seat frame member for providing additional support for it.

DETAILED DESCRIPTION OF THE PREFERRED EMBODIMENT

Figure 1:
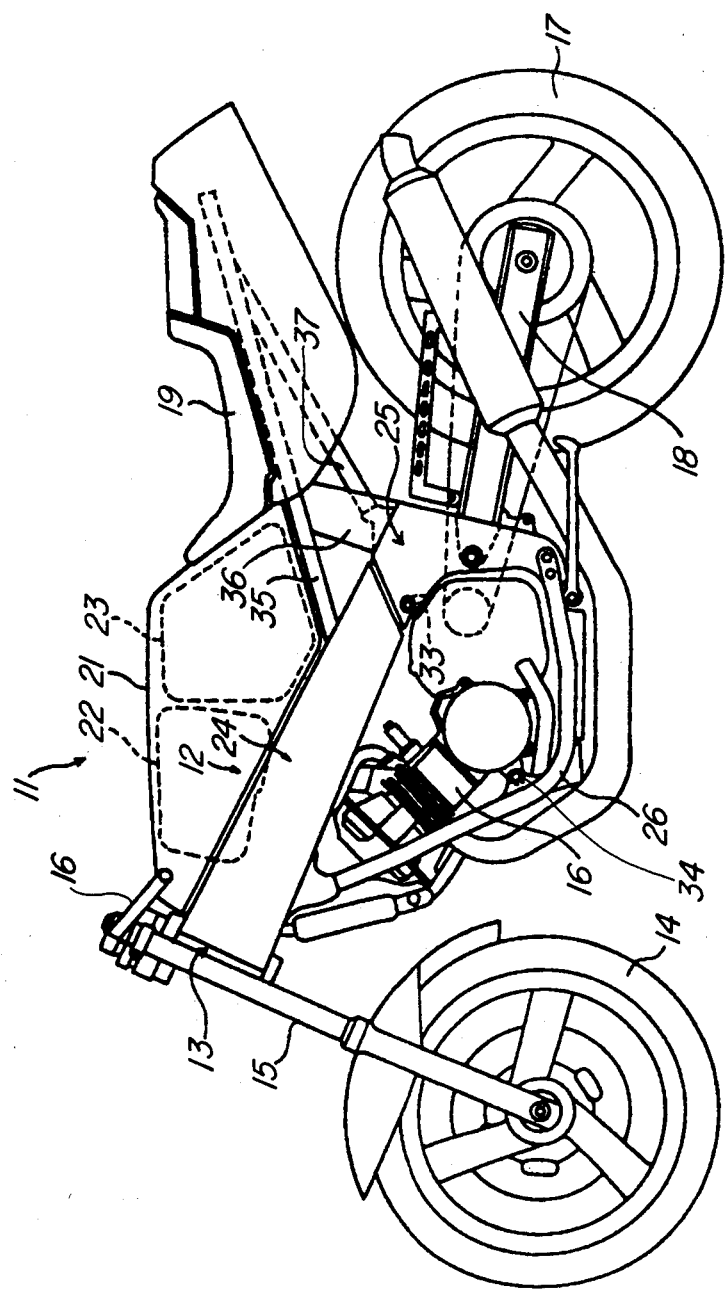
FIG. 1 is a side elevational view of a motorcycle constructed in accordance with an embodiment of the invention.

Referring now in detail to the drawings and initially primarily to FIG. 1, a motorcycle embodying the invention is identified generally by the reference numeral 11. The motorcycle 11 includes a frame assembly, indicated generally by the reference numeral 12, and includes a head pipe 13 that dirigibly supports a front wheel 14 by means of a front fork assembly 15. The front fork assembly 15 is connected to a handlebar 16 for steering of the front wheel 14 in a known manner.

An engine transmission assembly, indicated generally by the reference numeral 16, is supported within the frame assembly 12 in a manner to be described and drives a rear wheel 17 that is suspended from the frame assembly 12 by means of a trailing arm 18.

A rider's seat 19 is supported upon the frame assembly 12 and is positioned rearwardly of a main cowling 21 that encloses, among other things, an air cleaner 22 for the induction system of the engine 16 and a fuel tank 23.

Figure 2:
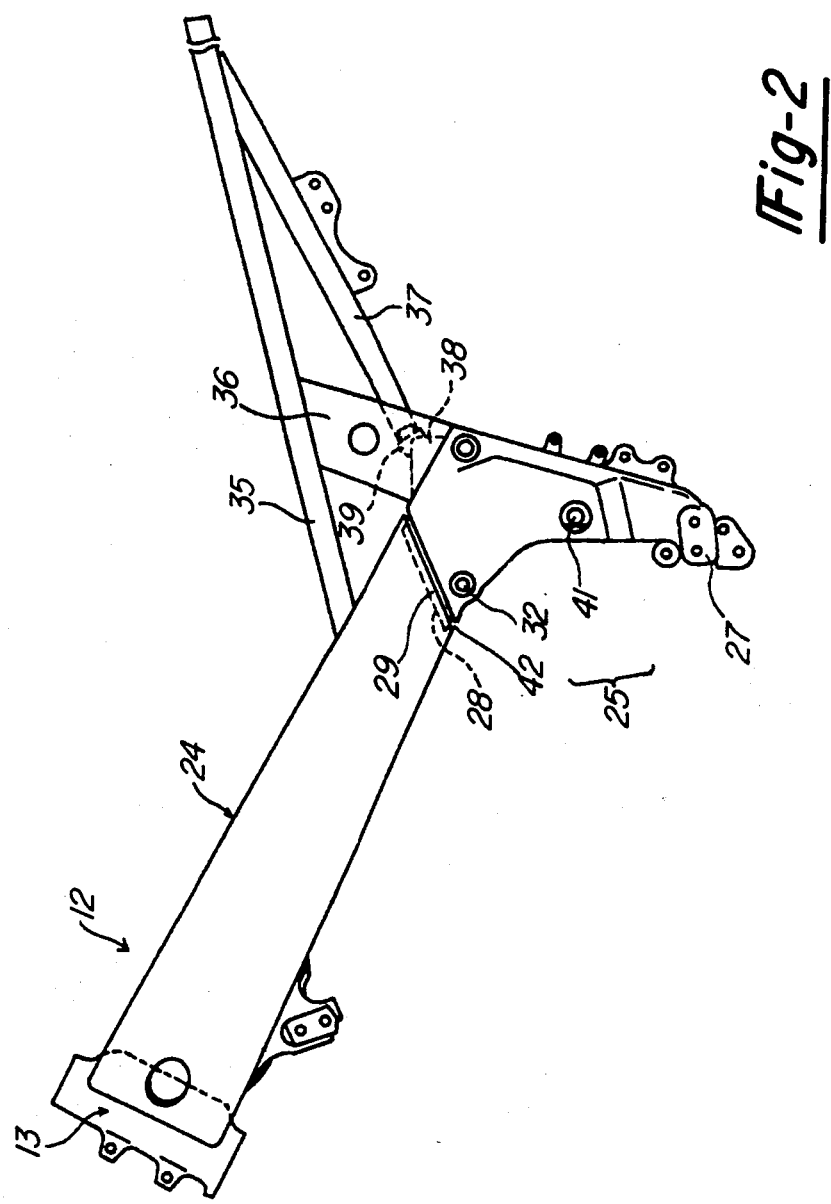
FIG. 2 is an enlarged side elevational view of the frame of the motorcycle.
Figure 3:
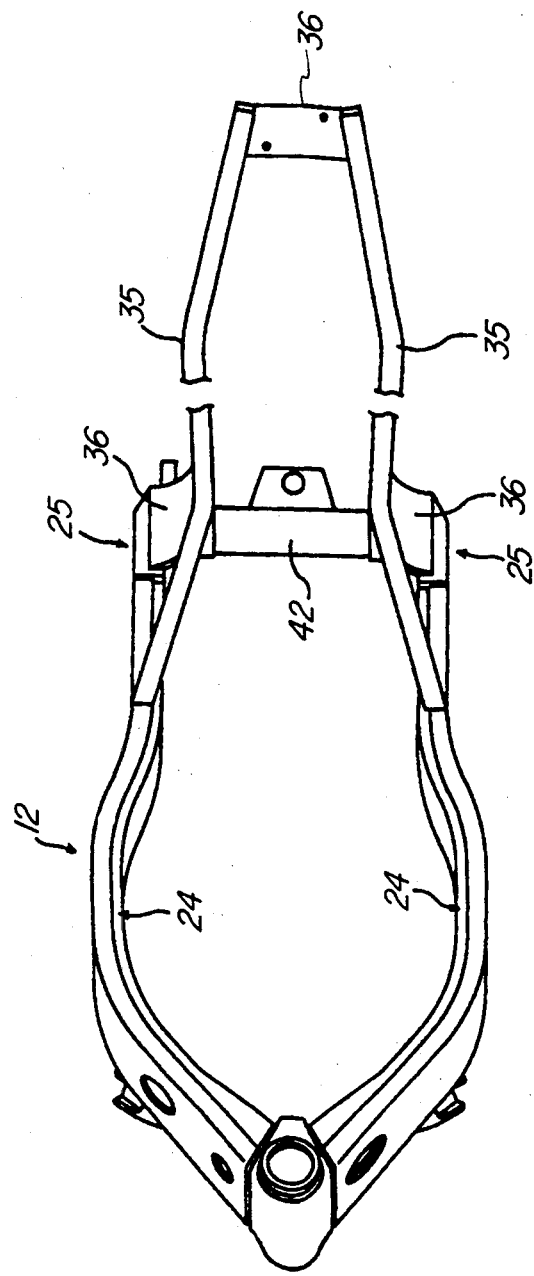
FIG. 3 is a top plan view of the frame.

Referring now primarily to FIGS. 2 and 3, the frame assembly 12 and its construction will be described. The frame assembly 12 includes, as has been noted, the head pipe 13 which may be formed from a lightweight material such as aluminum. A pair of main frame members 24 are affixed at their forward ends to the head pipe 13 and extend rearwardly and in an divergent fashion from the head pipe 13 to form a generally triangular configuration as shown in top plan (FIG. 3). The main frame members 24 may be formed from either a casting or stampings and have a generally box-shaped configuration. At their rear ends, each of the main frame members 24 is connected, as by welding, to an engine and trailing arm support member 25 which is also formed from a lightweight material such as aluminum. The engine and trailing arm support members 25 may be either formed as weldments or may be made as castings. A pair of down tubes 26 (FIG. 1) are affixed to the main frame members 24, as by bolting, and to the engine and trailing arm supporting members 25, as by bolting to a flange 27 of the latter.

In order to facilitate the attachment of the engine and trailing arm supporting members to the main frame members 24, the engine supporting members 25 are formed with projections 28 that extend into complementary shaped openings 29 formed at the rear end of the main frame members 24 and a weld joint around their periphery completes this connection.

The engine supporting members 25 are provided with a first series of openings 32 that receive an engine mount 33 (FIG. 1) so as to support the rear end of the engine transmission assembly 26. The forward end of the engine is supported on brackets 34 that are affixed, as by welding, to the down tubes 16 (FIG. 1).

A pair of seat supporting rails 35 are affixed at their forward ends to respective of the main frame members 24, as by welding. It should be noted that this attachment is formed forwardly of the attachment of the engine and trailing arm supporting member 25 to the main frame members 24. Intermediate the ends of the seat supporting rails 35, there is provided a reinforcing bracket 36, which may be formed from a lightweight material such as aluminum and which is affixed, as by welding, to the engine supporting member 25. The seat supporting rails 35 may be tubular or may be formed as square tubing sections and are connected to each other at their rearward ends by means of a plate 36. The rear end of the seat supporting members 35 is supported from the engine supporting member 25 by means of a pair of seat pillar rails 37 which, in turn, are formed from a lightweight material such as aluminum and may be either cylindrical or square tubular sections. The supporting members 25 are formed with upwardly extending projections 38 to which the seat pillar rails 37 are affixed, as by welds or socket joints 39.

The forward end of the trailing arm 17 is journaled in the engine and trailing arm supporting member 25 by means including a pair of aligned apertures 41 formed in the members 25 to receive suitable pivot pins. The supporting members 25 are further joined to each other by a bridging member 42 so as to further reinforce the frame assembly. The bridging member 42 may also be formed from a lightweight material such as aluminum.

It should be readily apparent from the foregoing description that the frame assembly is extremely light in weight and yet is very robust and strong. Although an embodiment of the invention has been illustrated and described, various changes and modifications may be made without departing from the spirit and scope of the invention, as defined by the appended claims.

I claim:

1. A frame assembly for a motorcycle type vehicle comprising a head pipe adapted to dirigibly support a front wheel, a pair of main frame members affixed at their forward ends to said head pipe and diverging rearwardly therefrom, said main frame members extending downwardly from said head pipe to their rear ends, a pair of engine and rear wheel supporting members each affixed to a respective rear end of said main frame members, a seat rail affixed to said main frame members forwardly of the connection of said main frame members to said engine and rear wheel supporting member and extending rearwardly and upwardly from their point of attachment to said main frame members, and supporting bracket means affixed to said engine and rear wheel supporting member and extending upwardly therefrom, said seat rails being supported by said supporting bracket means intermediate the ends of said seat rails.

2. A frame assembly as set forth in claim 1 further including a pair of seat pillar rails extending from the engine and rear wheel supporting members to the rear ends of the seat rails.

3. A frame assembly as set forth in claim 2 wherein the frame is made up of a lightweight material from stampings and castings.

4. A frame assembly as set forth in claim 3 wherein the engine and rear wheel supporting members comprise castings.

5. A frame assembly as set forth in claim 3 wherein the main frame members are formed sections.

6. A frame assembly as set forth in claim 5 wherein the engine and rear wheel supporting members comprise castings.

* * * * *